United States Patent
Irazábal et al.

(10) Patent No.: US 12,530,685 B2
(45) Date of Patent: Jan. 20, 2026

(54) DATA RETENTION IN A CRYPTOGRAPHICALLY VERIFIABLE IMMUTABLE DATABASE

(71) Applicant: Codenotary Inc., Bellaire, TX (US)

(72) Inventors: Jerónimo Irazábal, Buenos Aires (AR); Farhan Ali Khan, Bangalore (IN); Dennis Zimmer, Kuessnacht am Rigi (CH); Moshe Bar, Houston, TX (US)

(73) Assignee: Codenotary Inc., Bellaire, TX (US)

( * ) Notice: Subject to any disclaimer, the term of this patent is extended or adjusted under 35 U.S.C. 154(b) by 65 days.

(21) Appl. No.: 18/603,192

(22) Filed: Mar. 12, 2024

(65) Prior Publication Data

US 2024/0311826 A1 Sep. 19, 2024

Related U.S. Application Data

(60) Provisional application No. 63/451,795, filed on Mar. 13, 2023.

(51) Int. Cl.
*G06Q 20/40* (2012.01)
*G06Q 20/38* (2012.01)
*H04L 9/00* (2022.01)

(52) U.S. Cl.
CPC ......... *G06Q 20/401* (2013.01); *G06Q 20/382* (2013.01); *H04L 9/50* (2022.05)

(58) Field of Classification Search
None
See application file for complete search history.

(56) References Cited

U.S. PATENT DOCUMENTS

| | | | | |
|---|---|---|---|---|
| 9,361,243 | B2 * | 6/2016 | Shaath | G06F 16/176 |
| 11,196,567 | B2 * | 12/2021 | Certain | G06F 16/278 |
| 2013/0226931 | A1 * | 8/2013 | Hazel | G06F 16/134 |
| | | | | 707/752 |

* cited by examiner

*Primary Examiner* — Amresh Singh
(74) *Attorney, Agent, or Firm* — J. Roger Williams, Jr.

(57) ABSTRACT

Cryptographically-verifiable immutable database systems and methods for permanently deleting transaction value data from the immutable database system, preserving transaction verification data. Database schema data may be preserved when transaction value data is deleted.

20 Claims, 10 Drawing Sheets

DATA RETENTION IN A CRYPTOGRAPHICALLY VERIFIABLE IMMUTABLE DATABASE

This application claims the benefit of U.S. Provisional Application No. 63/451,795, filed on Mar. 13, 2023. The contents of the foregoing application (including source code and all other supplemental materials) are incorporated in their entirety.

COMPUTER PROGRAM LISTING APPENDIX

With this application, Applicant has also submitted via EFS-WEB the following three ASCII text files containing computer program listing appendices: (a) immustore_go.txt containing 76,813 bytes, and created on or before Mar. 13, 2023 (from a .go file created on or before Mar. 13, 2023); (b) TruncatorPkgTruncator_go.txt containing 6,501 bytes, and created on or before Mar. 13, 2023 (from a .go file created on or before Mar. 13, 2023), (c) DatabasePkgtruncator_go.txt containing 5,622 bytes, and created on or before Mar. 13, 2023 (from a .go file created on or before Mar. 13, 2023), The contents of the foregoing three computer program listing appendices are incorporated in their entirety.

FIELD OF THE INVENTION

The field of the invention is the management and storage of data on a computer system, specifically immutable and verifiable data storage subject to cryptographic proofs.

BACKGROUND

Storage of records has always been a fundamental objective of information systems. In the past decade, however, managing sensitive information throughout its lifecycle, from creation to destruction (or archival), has become of significant importance. Recent trends in privacy and data management compliance regulations have led to a retention approach different from the store-everything approach. Most organizations have realized that there can often be significant costs associated with storage of information. The protection of customers' personal and financial information, for example, is a duty and a potential source of liability for online businesses. As the size of a corporate record repository grows, so does the cost of an accidental information leak.

Globally, the number of regulatory requirements mandating businesses to retain records for minimum periods have increased significantly. For example, the EU Directive on Data Retention has explicitly mandated strict record keeping requirements for businesses such as telecommunications companies and Internet Service Providers. GDPR data retention rules require any personal data that is collected or processed to be kept only for as long as such data is required to achieve the purpose for which the information was collected. Under GDPR, data cannot be kept indefinitely. Any data controller or data processor should ensure personal information is securely deleted from the database when it is no longer required.

There are technological challenges associated with deleting stale data. Some enterprise platforms that incorporate append-only storage or immutable databases cope with high transaction volume by using concurrent processes to store transactions and/or storing portions of transactions in separate data files. In this scenario, transactions are neither stored nor easily retrievable in chronological order. For example, personal data could be stored in a separate data file from the other transaction data associated with the personal data, and personal data components could be stored in a different order from the other transaction components. In this scenario, it is a non-trivial technological problem to identify which portions of a data file containing stale data can be deleted without deleting any current data.

In addition, a consistent practice of deleting stale or unnecessary data provides clear technological benefits for enterprise platforms that rely on append-only storage or immutable databases by limiting the size and the growth rate of the corporate records repository.

Hence, it would be desirable for an enterprise-critical database to support retention policies based on physical deletion of data to comply with various compliance and regulations and to improve the technological capabilities of the system by limiting media storage requirements and growth rates for a corporate records repository.

Finally, some append-only or immutable databases store schema information about the database, e.g. table-creation commands, as independent transactions in the database. Deleting one of these transactions would make it difficult if not impossible to recreate the SQL database. There is a need for a solution that preserves the database SQL in any approach to truncating stale or unnecessary data in an append-only or immutable database.

SUMMARY

Disclosed herein are cryptographically-verifiable immutable database systems. In an embodiment, an immutable database system is adapted and configured to store transaction data for a plurality of transactions and to generate cryptographic verification data for such transaction data, wherein the immutable database system comprises first transaction value data and first transaction verification data corresponding to a first transaction. The immutable database system is programmed to determine that the first transaction satisfies deletion criteria and to permanently delete the first transaction value data, preserving the first transaction verification data.

In an embodiment, an immutable database system is adapted and configured to store transaction data for a plurality of transactions as key-value pairs and to generate cryptographic verification data for such transaction data. The immutable database system includes an append-only value log comprising a plurality of data files comprising transaction value data for the plurality of transactions stored as key-value pairs, including a first data file comprising first transaction value data from a first transaction, and an append-only hash tree comprising cryptographic verification data for the transaction data stored in the immutable database system, including first transaction verification data corresponding to the first transaction. The immutable database system is programmed to determine that the first transaction satisfies deletion criteria and to permanently delete the first transaction value data, preserving the first transaction verification data in the append-only hash tree.

In embodiments, the cryptographically-verifiable immutable database systems are further programmed to preserve database schema data for the immutable database system when permanently deleting transaction value data.

Also disclosed is a computer-implemented method of permanently deleting data from a cryptographically-verifiable immutable database system. The immutable database system is adapted and configured to store transaction data for a plurality of transactions and to generate cryptographic verification data for such transactions. The immutable database system comprises an append-only value log comprising a plurality of data files comprising transaction value data for the plurality of transactions, including a first data file comprising first transaction value data from a first transaction, and an append-only hash tree comprising cryptographic verification data for the transaction data stored in the immutable database system, including first transaction verification data corresponding to the first transaction. The method includes determining that the first transaction satisfies deletion criteria and permanently deleting the first transaction value data, preserving the first transaction verification data in the append-only hash tree. In an embodiment, the method further includes preserving database schema data for the immutable database system.

BRIEF DESCRIPTION OF DRAWINGS

The detailed description may refer to the following drawings, wherein like numerals refer to like elements, and wherein.

DETAILED DESCRIPTION

Described here are embodiments of immutable databases that can delete data, for example pursuant to data retention policies, whilst preserving the immutability of the database and cryptographic proofs for the existent data. In the context of this invention we assume the capabilities of an immutable key-value store, such as immudb (immudb: A Lightweight, Performant Immutable Database, Paik, Irazábal, Zimmer, Meloni). Such storage systems are not only able to store data as key-value pairs but also to generate and provide cryptographic proofs demonstrating its originality i.e. entries are not updated or deleted, at least not without leaving a proper trace of it.

Unlike non-immutable databases, immutable databases have additional complexity when it comes to physical deletion of data. This is because in immutable databases, data can only ever be added, not mutated, which in itself presents a unique challenge for dealing with deletion. Additionally, immutable databases preserve history, for example by storing proofs for (or data sufficient to prove) inclusion of records in a transaction and database consistency. The immudb database achieves this property by supporting the storage layer with a Mutable Merkle Hash Tree (MHT) (Crosby and Wallach, Laurie et al.). Consistency proofs tell us nothing was tampered with, whereas Inclusion proofs tell us to not simply trust the record, but to verify it by asking for proof from the server. These proofs may be maintained as append-only Merkle hash trees on disk. Deletion of this data is not as trivial as deleting nodes from the tree because of the way these proofs are constructed, and in addition because of the importance of preserving the accumulative state (history) of the database.

The immudb database system is very fast because of its append-only property, and processes thousands of transactions per second, which is possible due to concurrent processing of multiple transactions on the server. Under this type of load, it is impossible as a practical matter and technologically infeasible to maintain strict ordering of records (with respect to time) when they are written to a file on disk because of the nature of concurrent transactions, unless mutex locks are used exclusively for the entire transaction. But the use of locks slows down the database server drastically due to issues with lock contention. With asynchronous ordering of records in the file on disk, deletion is not as simple as truncating to a particular offset of a transaction because a future transaction could have been written on disk before a past transaction. Additional complexity lies in preservation of SQL schema catalog, because if the catalog is deleted, the SQL operations will fail.

These are some of the main reasons why many commercial alternatives to immudb only support soft deletes on the data in their database, and not actual physical deletion of data from disk itself.

Permanent (or Physical) Deletion of Data

Figure 6:
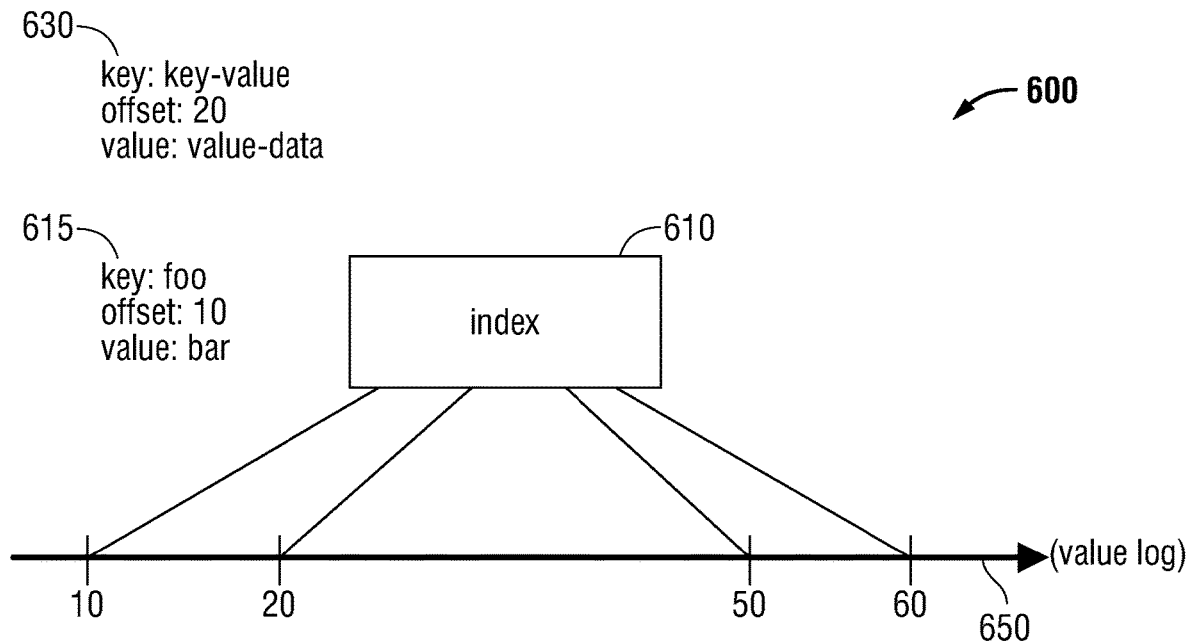
FIG. 6 illustrates aspects of an index in an embodiment of an immutable database.

Records may be deleted in two ways from a database: Soft Delete; and Hard Delete. "Soft delete" refers to the practice of marking a record as deleted, rather than actually deleting it from the database. This allows the deleted record to be recoverable, in case it was deleted by mistake or needs to be restored for some reason. One way to implement soft delete is to add a "deleted" flag or timestamp to each record, which can be used to filter out deleted records when querying the database. FIG. 6 illustrates aspects of an embodiment of soft deletion. In FIG. 6, index 610 includes transaction index values for transactions 615 and 630. Transactions 615 and 630 are stored as key-value pairs, and value log 650 contains the value records or components of transactions 615, 630. In transaction 615, the key value is "foo," the value record or component is "bar," and the value component is stored at offset 10 in value log 650. In transaction 630, the key value is "key-value," the value component is "value-data", and the value record or component is stored at offset 20 in value log 650. The value records for transactions 615 and 630 can be "soft deleted" by changing the index to flag the transaction records as deleted and/or deleting the offset value in index 610. However, the value components remain stored in value log 650.

Figure 7:
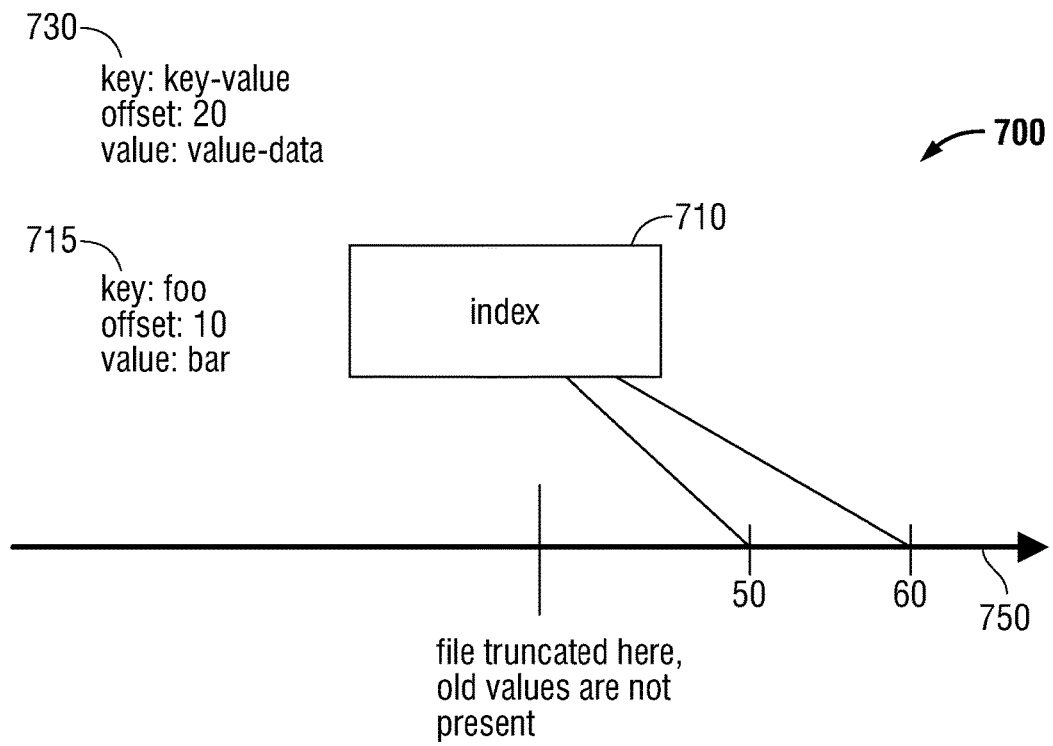
FIG. 7 illustrates aspects of an index in an embodiment of an immutable database.

"Hard delete," on the other hand, refers to the permanent deletion of a record from the database. When a record is hard deleted, it is removed from the database permanently and cannot be recovered. Both Soft delete and Hard delete have different use cases, Soft delete is mostly used when data has to be auditable and recoverable, while Hard delete is used when data is not supposed to be recoverable and data security is a major concern. FIG. 7 illustrates aspects of an embodiment of hard deletion. In FIG. 7, index 710 includes transaction index values for transactions 715 and 730. Transactions 715 and 730 are stored as key-value pairs, and value log 750 contains the value records or components of transactions 715, 730. In transaction 715, the key value is "foo,"

the value record or component is "bar," and the value component is stored at offset 10 in value log 750. In transaction 730, the key value is "key-value," the value component is "value-data", and the value record or component is stored at offset 20 in value log 750. The value records for transactions 715 and 730 can be "hard deleted" by truncating value log 750, or permanently (or physically) deleting that portion of value log 750 that contains the values at offsets 10 and 20, the value components of transactions 715, 730. Index 710 may remain intact, in an embodiment, but value log 750 no longer contains the value components.

In the context of compliance, for example, with the General Data Protection Regulation (GDPR), a hard delete refers to a permanent deletion of personal data from a database. This means that the data is not only marked as deleted, but is also permanently erased from the system and cannot be recovered.

In an embodiment, hard delete can be implemented in an immutable database in the following way:

Physical value deletion: The value data is deleted from the physical storage device on which the database is located, such as a hard drive or SSD. This method ensures that the data cannot be recovered (unless the database has been restored from a backup).

Preserve Digests: The SHA digests of the data may be still preserved in the Merkle hash tree, which would allow a verifier to check whether a particular piece of data is present in the tree by requesting inclusion proofs or consistency proofs for the database. Since the digests may be stored in the hashed form, this makes it more difficult for unauthorized parties to access or use the original data. In an embodiment, even though the data is deleted and unreadable, the proofs can still be generated to audit the database.

Preserve SQL catalog: When deleting data from an append-only log, important data may be preserved to maintain the integrity of the database. When a database is created, or when SQL schema operations are written to the database for table/index creation, these SQL commands may be preserved as key-value pairs in the append-only value log. When physical deletion is done on the values, a new transaction may be created with the entire SQL catalog of the database; the new transaction may be committed to the database as a new transaction, and then the append-only log may be truncated. In an embodiment, this process preserves the SQL catalog for the entire database. This new transaction, which may be committed before truncation, also may store the information of the transaction up to which data is being truncated in the header metadata. This metadata can then be used for auditing purposes.

Architecture

An embodiment of an immutable database includes the following files: Appendable Hash Tree; Commit log (commit); Timed B-Tree (index); Transaction log (tx); Value log (val_x). In an embodiment each of the files is append-only.

Each log may be responsible for storing a section of the record. The storage layer may consist of the following append-only logs per database.

AHT: Append-only Hash Tree. Each database may have one main Merkle Tree where its inputs are built from transaction hashes. This tree may be persisted in the storage layer. It is also appendable—each new transaction adds one extra leaf node with transaction hash (Alh) and rebuilds the path to the root. The AHT (Append-only Hash Tree) may be a versioned Merkle tree where records are stored as digests left-to-right at the lowest level, following an append-only model. Like a hash chain, this AHT may be persistent, with the difference that it supports efficient inclusion and consistency proofs. In an embodiment the AHT grows from left to right. In an embodiment the AHT always grows from left to right. In embodiments this growth property allows us to make efficient claims about the past because we can reconstruct old versions of the tree by pruning specific branches from right to left.

Transaction Log: An append-only log for storing the transaction headers for a transaction. This helps in reading the header information of a transaction easily, as the header size (in an embodiment) is fixed.

Commit Log: An append-only log for storing the information about the commits to a database. This log stores the transaction in an ordered way and is used for database recovery as transactions written in this log can be considered fully committed.

Value Log: An append-only log for storing the actual values (or value components) of the one or more key-value pairs within a transaction. The underlying data structure is again an append-only log. This log may be kept separate for faster reads, and because many other data structures may internally refer to the values, storing it in a separate log provides ease of access. The B-Tree index and transaction headers may not store the value itself but may refer to the offset of the value in the value-log appendable. In an embodiment, the value-log comprises different files (or chunks) of configurable size, by default 512 MB.

Index Log: An append-only log for storing the index for transactions in a database. An embodiment uses a B-Tree to index database records and to provide SQL support, and the index log is the B-Tree storage on disk.

Figure 1:
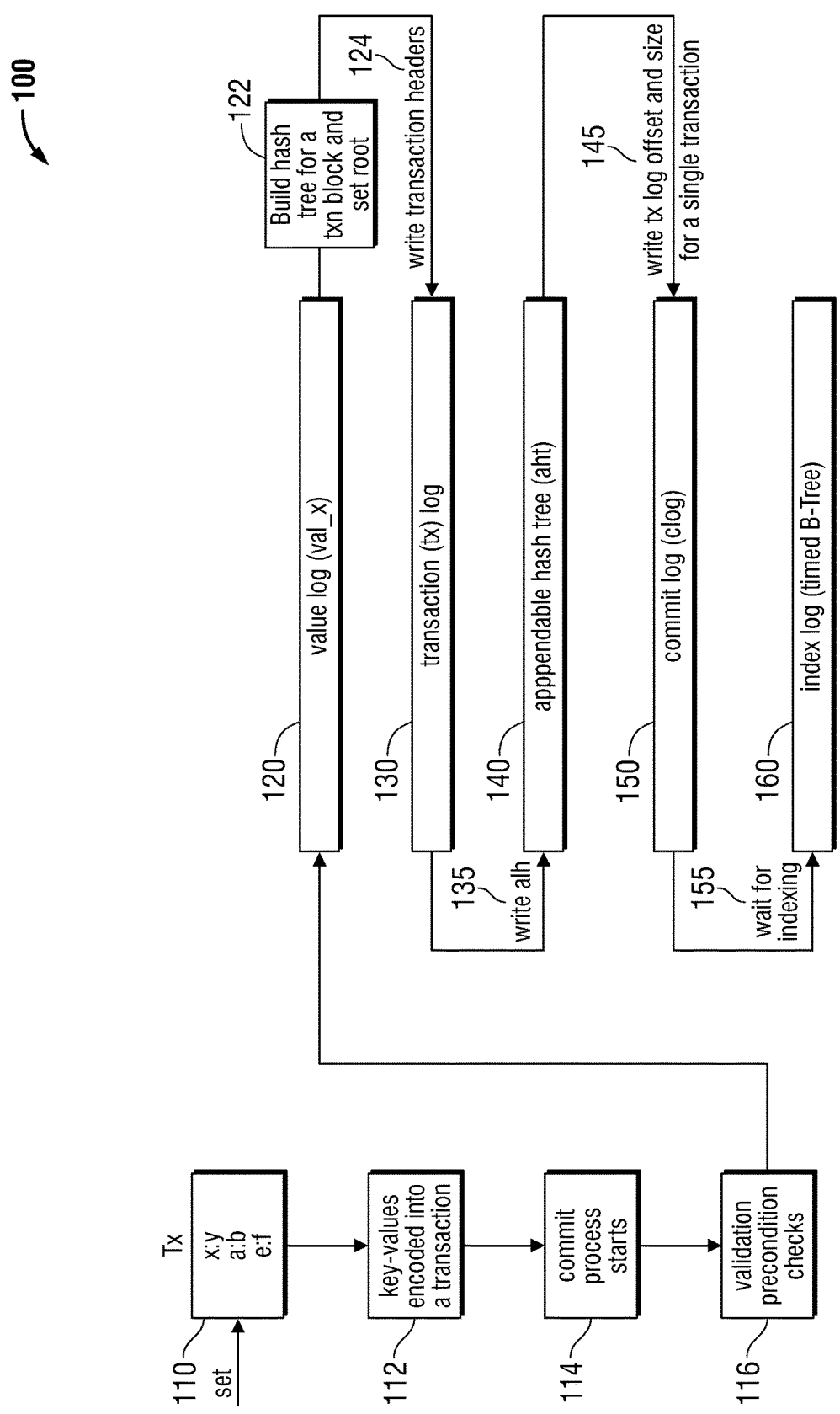
FIG. 1 illustrates the life cycle of an exemplary transaction in an embodiment of an immutable database.

FIG. 1 illustrates the exemplary events 100 that may occur in an embodiment when a transaction is saved in an immutable database.

A transaction includes one or more key-value pairs (110). In an embodiment, the process of storing the transaction may include encoding the key-values into a transaction format (112), starting a commit process (114), and performing one or more validation precondition checks (116).

For each key-value pair in the transaction, the value components may be stored in the value_log appendable, an append-only file (120). The value-log append-only file may be stored in multiple files (or chunks) of configurable size, e.g., 512 MB, each with its own unique file name in the operating system. The offset of the data in the value-log (and in an embodiment, the offset within a specific named chunk) may be stored in other logs, such as the B-tree index and the transaction header log. A new chunk may be created when the next value to be stored would cause the value-log to exceed the chunk size.

Figure 4:
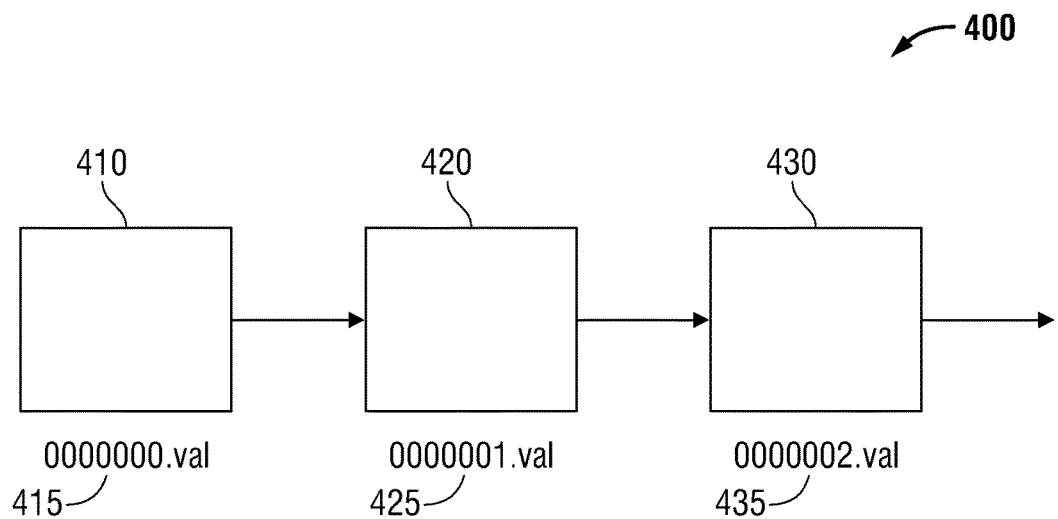
FIG. 4 illustrates value log components in an embodiment of an immutable database.

FIG. 4 illustrates an embodiment of a value-log append-only file 400 with chunks (files) 415, 425, 435. As illustrated in FIG. 4, the operating system file name assigned to each chunk defines a unique numerical ordering of the chunks, for example, file name 0000000.val (415) for chunk 410, file name 0000001.val (425) for chunk 420, file name 0000002.val (435) for chunk 430, etc. In an embodiment, the numerical ordering of the chunk file names also defines a unique linear ordering of the chunks.

In an embodiment the numerical ordering of the chunk file names defines a chronological ordering of the chunks. In this embodiment, if the numerical value of the file name of one chunk (e.g., 0000025.val) is greater than the numerical value of the file name of another chunk (e.g., 0000024.val), it can be assumed that every value component in the higher-value file name chunk (0000025.val) was stored after each of value components were stored in the lower-value file name chunk (0000024.val).

In an alternative embodiment, value-log files may be stored concurrently in multiple chunks, and the numerical ordering of chunk file names does not define a unique chronological ordering. Alternative embodiments can use other portions of the file name and/or file metadata to provide a unique chronological or other linear ordering for the different chunks. In an embodiment, the process that stores the value components in a chunk is responsible for creating and naming a new chunk when necessary.

Continuing with FIG. 1, the key components (of the key-value pairs) may be encoded in a transaction and the offset in the value-log appendable of the value component associated with each key may be stored in a transaction header in the transaction log. (130). In an embodiment, the offset may include the name of the chunk, which may be (or include) the unique operating system file name, and the offset value within the chunk of the value log. In an embodiment, when a transaction includes multiple key-value pairs, a hash tree may be constructed over the key-value data (122) and the root value of the hash tree may be included in the transaction header (124) in the transaction log.

Figure 2:
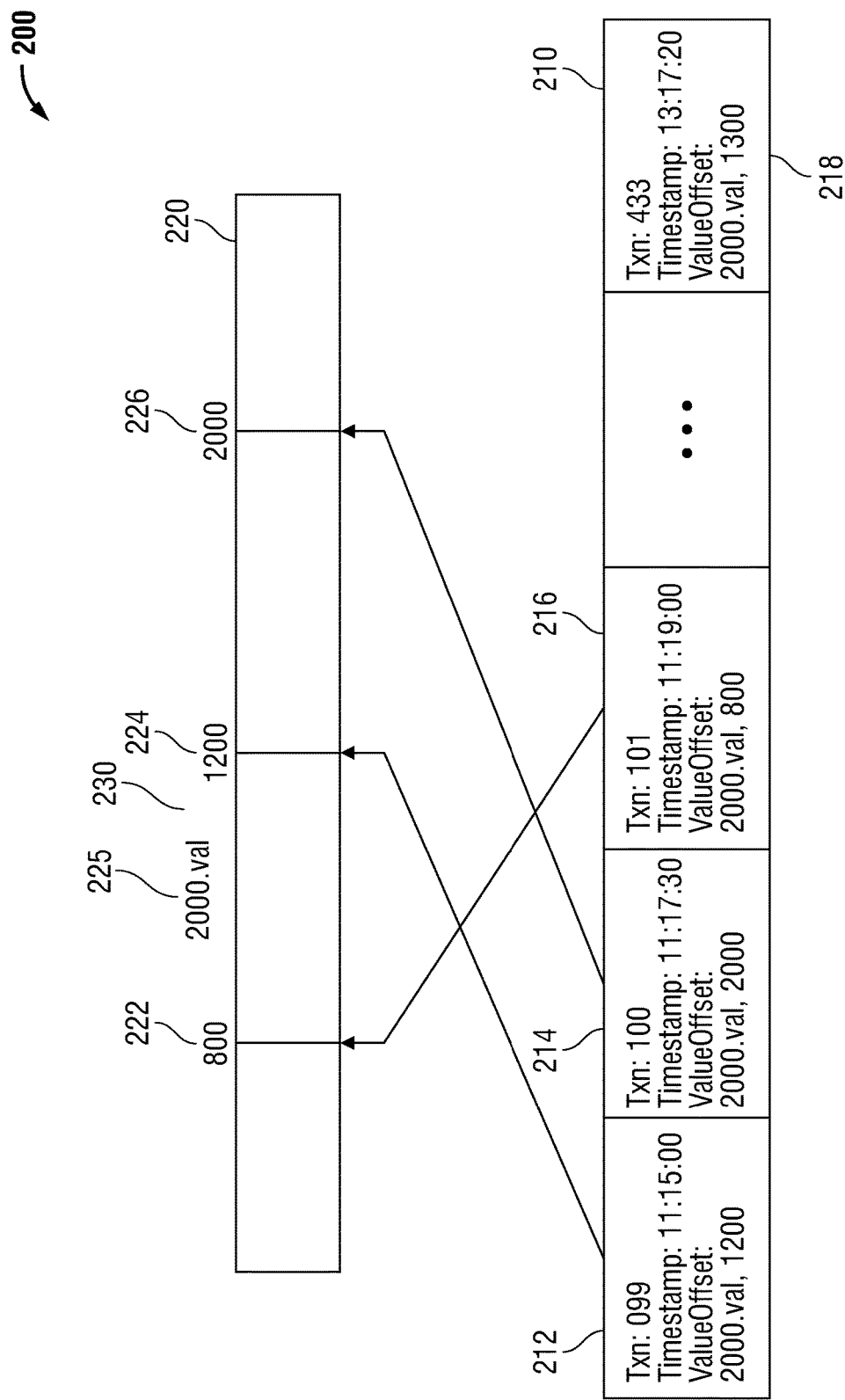
FIG. 2 illustrates aspects of a value log and a transaction log in an embodiment of an immutable database.

FIG. 2 illustrates aspects of a value log and a transaction log in an embodiment of an immutable database. FIG. 2 shows an excerpt of a chunk 220 of exemplary value-log 230, with file name 2000.val (225), and an excerpt of exemplary transaction log 210 with transaction headers 212, 214, 216, and 218. Exemplary transaction header 212 corresponds to transaction 099 and includes a time-stamp and valueOffset data comprising the chunk file name 225 (2000.val), and the offset value 1200 (224) identifying the location within the file (chunk) 220 where the value component of transaction 099 is stored. Similarly, exemplary transaction header 214 corresponds to transaction 100, and the valueOffset comprises the chunk file name 225 (2000.val) and the offset value 2000 (226) within the file (chunk) (220) where the value component of transaction 100 is stored; and exemplary transaction header 216 corresponds to transaction 101, and the valueOffset comprises the chunk file name 225 (2000.val), and the offset 800 (222) within the file (chunk) 220 where the value component of transaction 101 is stored. FIG. 2 illustrates an embodiment where the sequential and chronological-ordering of transaction headers in transaction log 210 does not match the order in which value data has been stored in value log 230.

Returning to FIG. 1, in 140, cryptographic verification data may be added to the transaction header. In an embodiment, an accumulated linear hash (ALH) may be built by chaining (concatenating) the hash of the current transaction+ previous transactions ALH+an inner hash of components of the transaction. This ALH value may be appended to the AHT (135) where the Merkle tree is stored (and which may include the data to support cryptographic inclusion and consistency proofs).

In an embodiment there may be many concurrent transactions happening on the server, and in 150 the commit log stores information of transaction ordering. In an embodiment, the transaction header offset (from the transaction log) and size of the transaction are stored in the commit log (145). In an embodiment, the construction of the transaction header, the ALH, and the commit log record may occur as a locked atomic transaction.

In 160, the keys and value offset information may be stored in the B-Tree index. In an embodiment, the indexing may happen asynchronously (155), In an embodiment, the indexing can be recreated on a restart of the database.

Solution

In an embodiment, when a transaction is stored in the database, the details of the transaction may be stored in the transaction (tx) log and the commit log. The ALH (accumulated linear hash) may be stored in the AHT log. The index log or B-tree index may store the mapping from the key to the offset in the value log. The value log is where the values are actually stored in an append-only format.

For time-based data retention, the solution includes truncating the value logs where the actual values reside. In a use case, data may be retained for a specified period of time, but must be deleted after a that specified period of time. Deleting data from a log where records are not ordered by time can be a more complex task than deleting data from a log where records are ordered by time.

Figure 10:
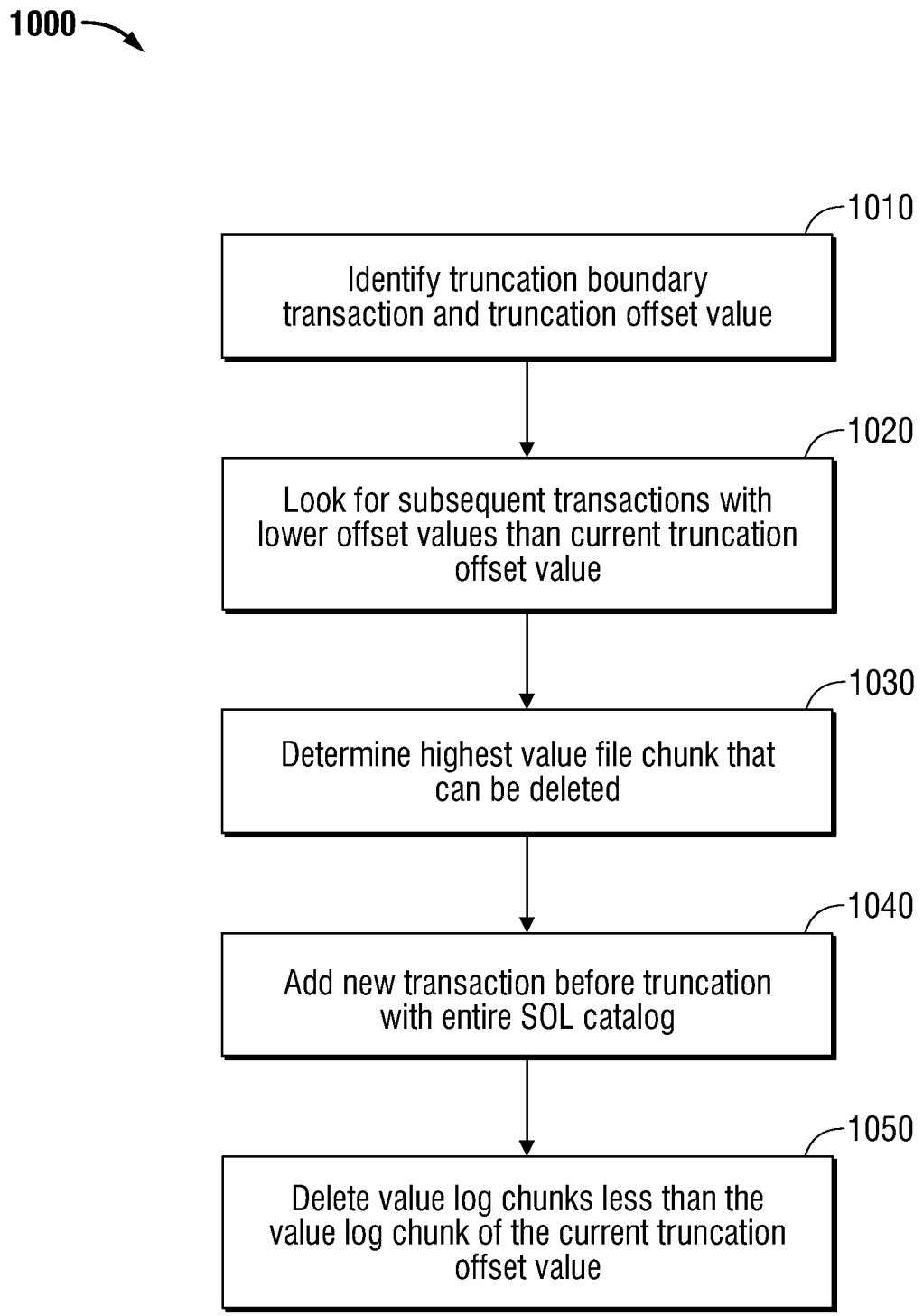
FIG. 10 illustrates an embodiment of a method of deleting data from an append-only log.

FIG. 10 illustrates the steps of an embodiment of a method 1000 for deleting data from a log wherein records are not ordered by time.

In general, the task is to identify the truncation point in the value log. The truncation point may depend on the criteria for truncation and may be an offset value within the value log. For example, in an embodiment in which time-based retention criteria determine which data should be truncated, the truncation point may be an offset value (the truncation offset value) equal to the offset value in the value-log where all values with offsets below the truncation offset value (i.e., values saved before the value saved at the truncation offset value) should be or can be deleted, and all values with offsets equal to or above the truncation offset value must be preserved.

In an embodiment, the first step 1010 in identifying the truncation offset value is to identify a truncation boundary transaction and its value offset. In an embodiment in which time-based retention criteria determine truncation, someone (for example, a database admin) can specify the retention period for how long data may be maintained in the database, and stale data (i.e., data that has been stored longer than the retention period) may be deleted automatically. For example by a background process. If the retention period is 2 hours, for example, a truncation process could run in the background every minute and identify the most recent, in chronological terms, transaction that is more than 2 hours older (before) the reference transaction. In an embodiment, the transaction header for each transaction may include a time stamp, and the deletion point can be identified by comparing transaction timestamps. This means that the gap between the oldest transaction timestamp and the timestamp of the reference transaction is greater than or equal to 2:00:00 hours, and the truncation boundary transaction is the transaction whose time stamp is the lowest value greater than or equal to 2:00:00 hours before the current (or other reference) transaction timestamp.

After the truncation boundary transaction has been identified, for example, by comparing timestamps, the offset value for that transaction will be identified, and the truncation offset value is initialized to the offset value for the truncation boundary transaction.

FIG. 2 illustrates this process in connection with an exemplary 2-hour retention period. Assume that the reference transaction header 218 for transaction number 433 includes a timestamp of 13:17:20. Transaction no. 100 is the truncation boundary. The difference between its timestamp value (11:17:30) and the timestamp value in the reference transaction is 2:00:10, which is the lowest value in this transaction log file for greater than or equal to the retention period. The truncation offset value is initialized to the value offset for transaction 100, offset 2000 in the chunk with file name (225) 2000.val.

In an embodiment, the values in the value-log are not strictly sorted monotonically with increase in time, and there could be some value entries in the value-log with a lower offset value (compared to the offset value of the truncation boundary transaction) but which belong to a future or subsequent transaction. The offset value for the truncation boundary transaction is not necessarily the correct location to truncate the value-log appendable. In an embodiment, value log components may be stored at a different rate in the value-log because, for example, values are bigger than transaction headers, values are written to the value log by concurrently or by concurrent processes, the value log datastore has different latency, or the value are stored by a different process. Accordingly, value components may be ordered, in the value-log appendable, differently from the corresponding transactions in the transaction log. Because value components are not necessarily stored in the value-log appendable in the same order as the corresponding transactions, there may be transactions subsequent to truncation boundary transaction whose value components were stored before the value component of the truncation boundary transaction, i.e., with a lower offset in the value-log appendable.

In the excerpt of exemplary transaction log 210 shown in FIG. 2, transaction header 212 for transaction number 099 with timestamp 11:15:00 precedes (in the transaction log) transaction header 214 for transaction number 100 with timestamp 11:17:30, which precedes (in the transaction log) transaction header 216 for transaction number 101 with timestamp 11:19:00. However, the value component for transaction 101 is stored at offset value 800 (222) in chunk 2000.val, lower than (before) the offset values for transactions 099 (offset value 1200 in 2000.val) and 100 (offset value 2000 in 2000.val). If (as discussed above), transaction 100 is the current candidate boundary transaction, its offset value (2000) would not be the correct transaction offset value because using that value would lead to the deletion of the value component of transaction 099 even though transaction 099 is less than 2 hours from the reference transaction and is not scheduled for time-based truncation.

In step 1020 (FIG. 10), look for subsequent transactions with lower offset values than the current truncation offset value. In an embodiment, this may be accomplished by reading ahead in all transactions in the various transaction log files to check if there are any other, future or subsequent transactions whose offset value lies before (is lower than) the current truncation offset value. If one is found, the offset value for that transaction becomes the new current truncation offset value, and the search continues until the read-ahead method is completed.

Figure 5:
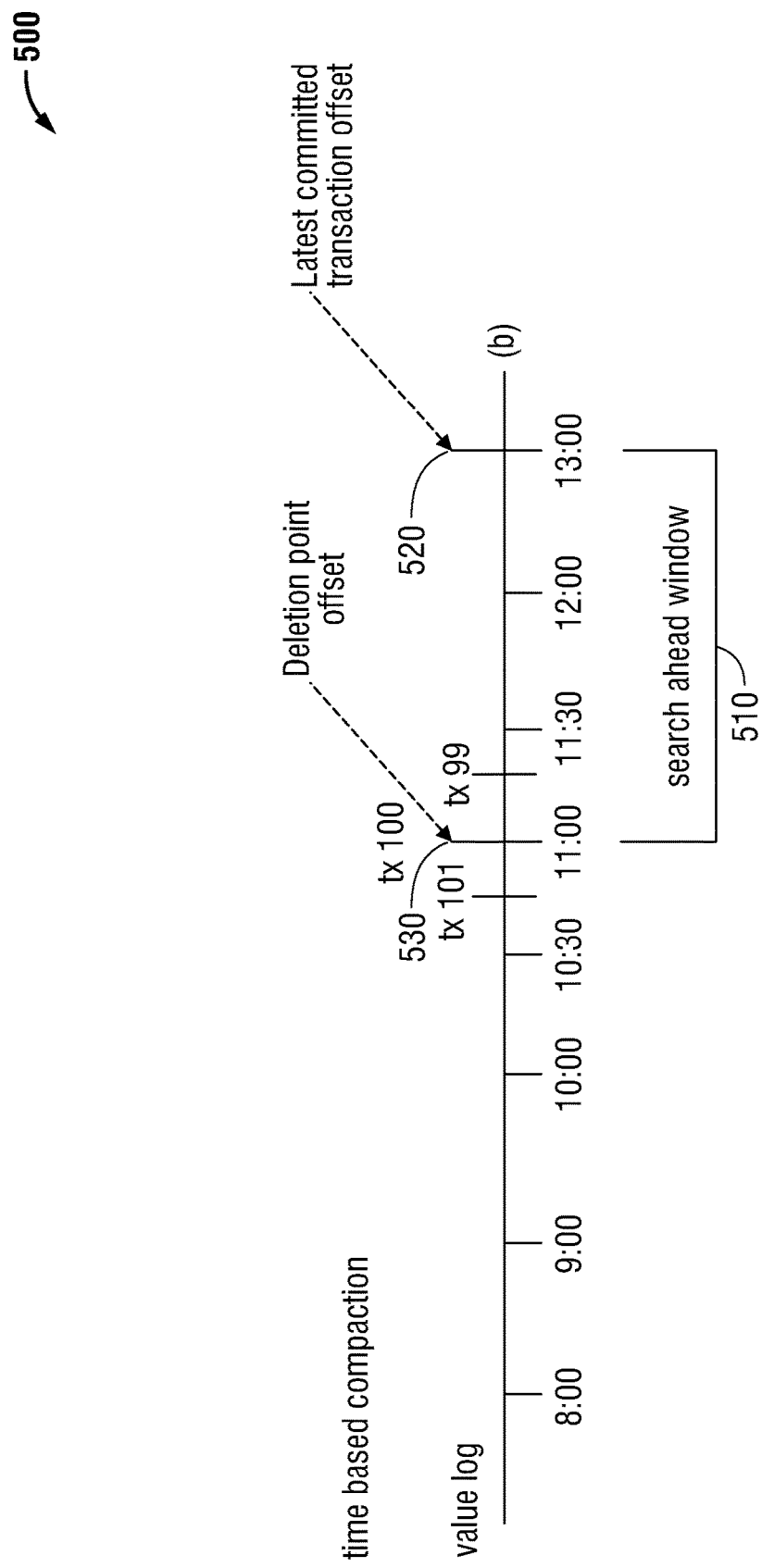
FIG. 5 illustrates an exemplary look-ahead window.

In an embodiment, one method of reading ahead includes searching forward in the transaction log from the transaction header associated with the truncation boundary transaction to the latest (or most recent) committed transaction and reading each transaction header to see if any transaction includes a value offset lower than the current truncation offset value. Another embodiment of a method of reading ahead, which avoids reading excess amounts of data during truncation, includes searching the transaction log for a specified period of time in the future (for example, 2 hours, 6 hours, a day, or a week) from the time of the truncation boundary transaction. These options are illustrated in FIG. 5. In FIG. 5, the current candidate for the current truncation offset value is txn 100 (53) at 11:00. The look-ahead window (512) for searching for other transactions with lower offset values than txn 100 (53) may be a specified time interval, for example 2 hours, or the look-ahead window (512) may end at the latest committed transaction (520).

In an embodiment, the value-log appendable may be truncated by deleting entire chunks of the value log. In step 1030 in exemplary method 1000 (FIG. 10), determine the highest value file chunk that can be deleted without deleting any future transaction to preserve data integrity. In an embodiment, the highest value chunk that can be deleted can be determined from the truncation offset value. The truncation offset value includes the name of the value file chunk and the offset value. The file chunk immediately preceding the file chunk in the truncation offset value, and any file chunk preceding that one, can be deleted. For example, if the chunk file name is nnnn.val, the chunks that can be deleted are any chunks whose file name is a numeric value less than or equal to nnnn−1.

Figure 11:
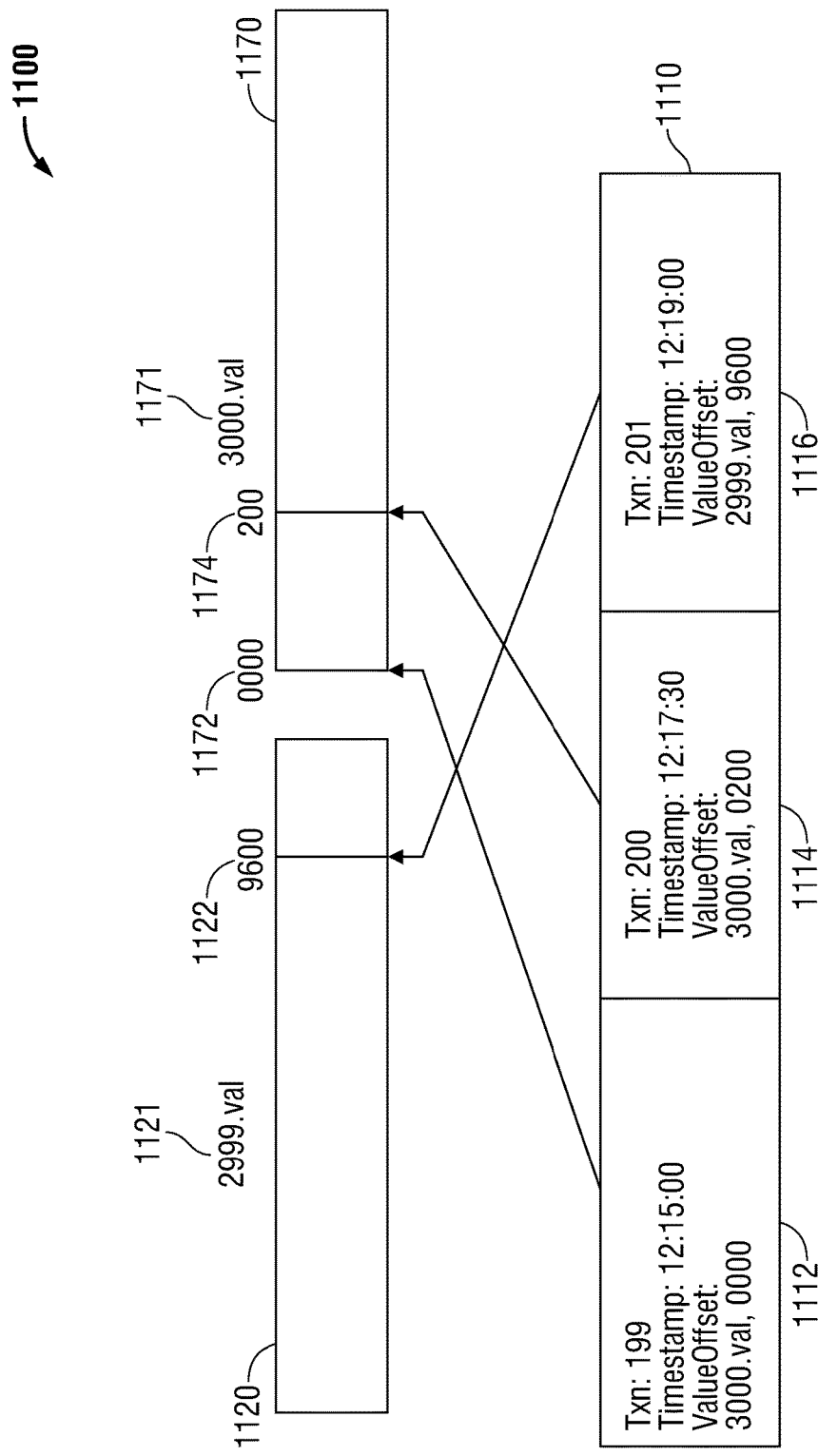
FIG. 11 illustrates aspects of a value log and a transaction log in an embodiment of an immutable database.

FIG. 11 shows excerpts from exemplary value log chunk files 1120 and 1170 and excerpts from exemplary transaction log 1110. Transaction log 1110 includes transaction headers 1112, for transaction 199, 1114 for transaction no. 200, and transaction header 1116 for transaction 201. As shown in transaction header 1114, the value offsets for transaction 200 is 200 in value log chunk 1170 with file name (1171) 3000.val. If this offset (offset 0200 in value log chunk 1170) is the truncation offset value, the chunks that can be deleted are chunk 1120 with file name (1121) 2999.val and any other chunk whose file name is a numeric value before, lower than, or less than 2999. However, if the truncation offset value is the offset shown in transaction header 1116 for transaction 201 (offset 9600) in chunk 1120 with file name (1121) 2999.val, the chunks that could be deleted would be the chunk with file name 2998.val (not shown) and any other chunks whose file name is a numeric value before, less than, or lower than 2998.

Figure 3:
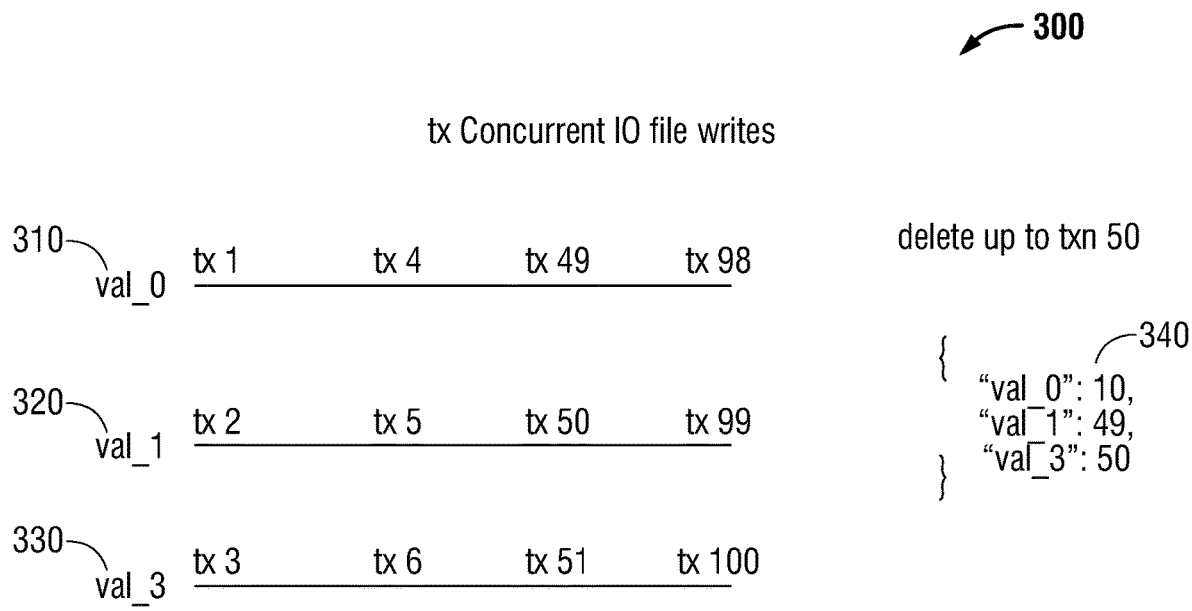
FIG. 3 illustrates aspects of value log concurrency in an embodiment of an immutable database.

In an embodiment, data throughput can be increased by, for example, writing data to multiple value logs concurrently. In immudb, for example, multiple value logs can be enabled by user selection of the MaxIOConcurrency setting. During concurrent transactions, data is not stored in a strictly monotonically increasing order of time, because the values are written concurrently to the file. In the presence of multiple value logs, the transactions can be written across multiple value logs, as shown in FIG. 3 (with an IO concurrency of 3). FIG. 3 shows value logs val_0 (310), val_1 (320), and val_2 (330). In such embodiments, a map of value-log records to offset may be maintained to determine the offset up to which (or, in an embodiment, below which) the values in each value-log can be truncated. An exemplary map 340 is shown in FIG. 3.

Figure 12:
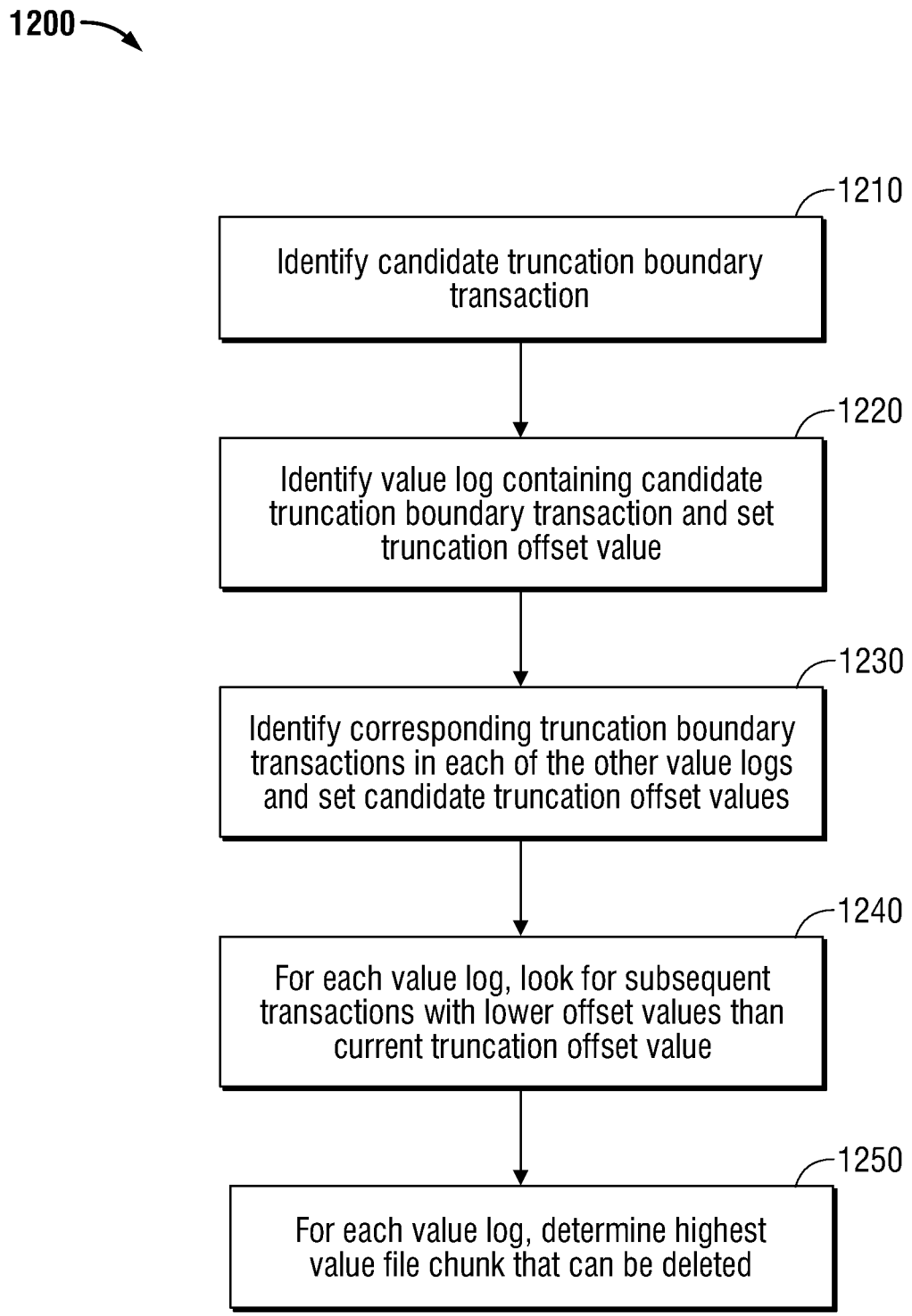
FIG. 12 illustrates an embodiment of a method of deleting data from an embodiment with multiple append-only logs.

In an embodiment with concurrent writes to multiple value logs, FIG. 12 illustrates an embodiment of an exemplary process 1200 for identifying the truncation boundary transaction, truncation offset value, and highest value chunk for truncation.

In step 1210, identify a candidate truncation boundary transaction by, for example, comparing timestamps. In FIG. 3, the exemplary truncation boundary transaction is transaction no. 50.

In step 1220, identify which of the multiple value logs stores the value component for transaction 50. In FIG. 3, the value for transaction 50 is stored in value log val_1 (320).

Initialize the truncation value offset for value log val_1 with the offset value for transaction 50. In an embodiment, the map (340) of value-log records stores the current truncation offset value for each value log.

In step 1230, identify truncation boundary transactions corresponding to transaction 50 in each of the other value logs val_0 and val_2. An exemplary approach for doing so is as follows: Start with the other value log with the lowest index value, for example val_0. Search the transaction log backwards and forwards from transaction 50 to identify transactions whose values are stored in value log val_0, and select the transaction that is both outside (i.e., before) the data retention window and closest in time to transaction 50, and designate that transaction the truncation boundary transaction for val_0. Repeat this process for each other value log(s), e.g., val_1. At the conclusion of this process there is truncation boundary transaction for each value log. Initialize the truncation offset value with the offset for the truncation boundary transaction for each value log.

In step 1240, look ahead (using the exemplary methods described above) in the transaction logs to identify subsequent transactions whose values are stored at a lower offset value than the current truncation offset value for each value log. In an embodiment, the transaction logs are searched for each value log for subsequent transactions with lower offset values for the current truncation offset value in that value log. In an alternative embodiment, the transaction logs are searched in one pass for subsequent transactions with lower offset values for the current truncation offset value for all value logs. At the conclusion of this look ahead process, there is an updated current truncation offset value for each value log. In an embodiment the truncation offset value for each value log is stored in the map of value-log records.

In step 1250, determine the highest value chunk that can be deleted. In an embodiment with concurrent writes to multiple value logs, each value log comprises multiple file chunks. In an embodiment, each value log has its own unique set of file chunks that are not shared with other value logs. As before, the offset value in the transaction log may include the chunk file name. The highest value chunk that can be deleted is determined in a similar manner as discussed above in connection with FIGS. 10 and 11, except with reference to the unique file chunks comprised in each value log and the naming conventions used for each file chunk. For each value log, any file chunk whose numeric index value (in the file name) is lower than the numeric index value of the chunk file name in the truncation offset value can be deleted.

For example, in an embodiment where the file naming convention for each chunk file name includes the name of the value log file and monotonically-increasing numeric index value (for example, for value log val_x, val_x_0000, val_x_0001, val_x_0002, etc.), and where the file chunk name in the truncation offset value is val_x_nnnn, the chunks that can be deleted are any chunks for which the numeric value of the index component of the file name is a numeric value less than nnnn, for example val_x_nnnn-1, val_x_nnnn-2, etc. In alternative embodiments, for example, where each value log can store values in the same chunk file, the process includes identifying the chunk file with the lowest index number for any transaction to be deleted over all the value log files, and then deleting the chunks with a lower numeric index component in the file name.

After one or more value log chunks have been deleted, the data values stored in the value log chunks has been permanently deleted from the append-only value log and from the immutable database system. In an embodiment, deletion of the value component of a key-value transaction does not include deletion of the key values or verification data (for example, SHA digests of the data and other data sufficient to provide cryptographic proofs such as inclusion or consistency) that was stored when the transaction was first stored. In an embodiment, verification data corresponding to each transaction that was originally stored in other data structures, for example, the append-only hash tree, transaction log, commit log, or index log, is preserved when the append-only value log is truncated. In an embodiment the verification data is preserved in the append-only hash tree. Because the verification data has been preserved, the immutable database system can still provide cryptographic proofs for all transactions stored in the immutable database, even when the value component of certain transactions has been permanently deleted.

SQL Schema Preservation

Returning to FIG. 10, in step 1040, add a new transaction containing the entire SQL catalog, preferably, in an embodiment, before truncation, to preserve loss of important data when truncating value logs. In an embodiment, information about the transaction up to which the log is being deleted may be stored in the metadata of the transaction. The schema of the database, and multiple SQL tables, indexes and statements may be written to the value log as normal key-value pairs. If the value-log is truncated, it could lead to loss of data related to the schema which could corrupt the database and none of the SQL transactions would work. To prevent this, just before truncation, a new transaction with the entire SQL catalog may be committed every time the truncation process happens. Because of the way data is read in the B-Tree index, it fetches the latest schema from the logs enables preservation of the schema during truncation.

In step 1050 (FIG. 10), delete the portion of the value-log up to the least offset value. In an embodiment, this means deleting all value-log chunks whose file name is less than the value-log chunk file name of the transaction offset value. After deletion of the chunks, any attempt to ready those records may return an error.

As data is sensitive, it is recommended to have a good backup strategy and after deletion process, a secure deletion process (shredding) of the deleted data to ensure that the data cannot be recovered.

System Environment

Figure 8:
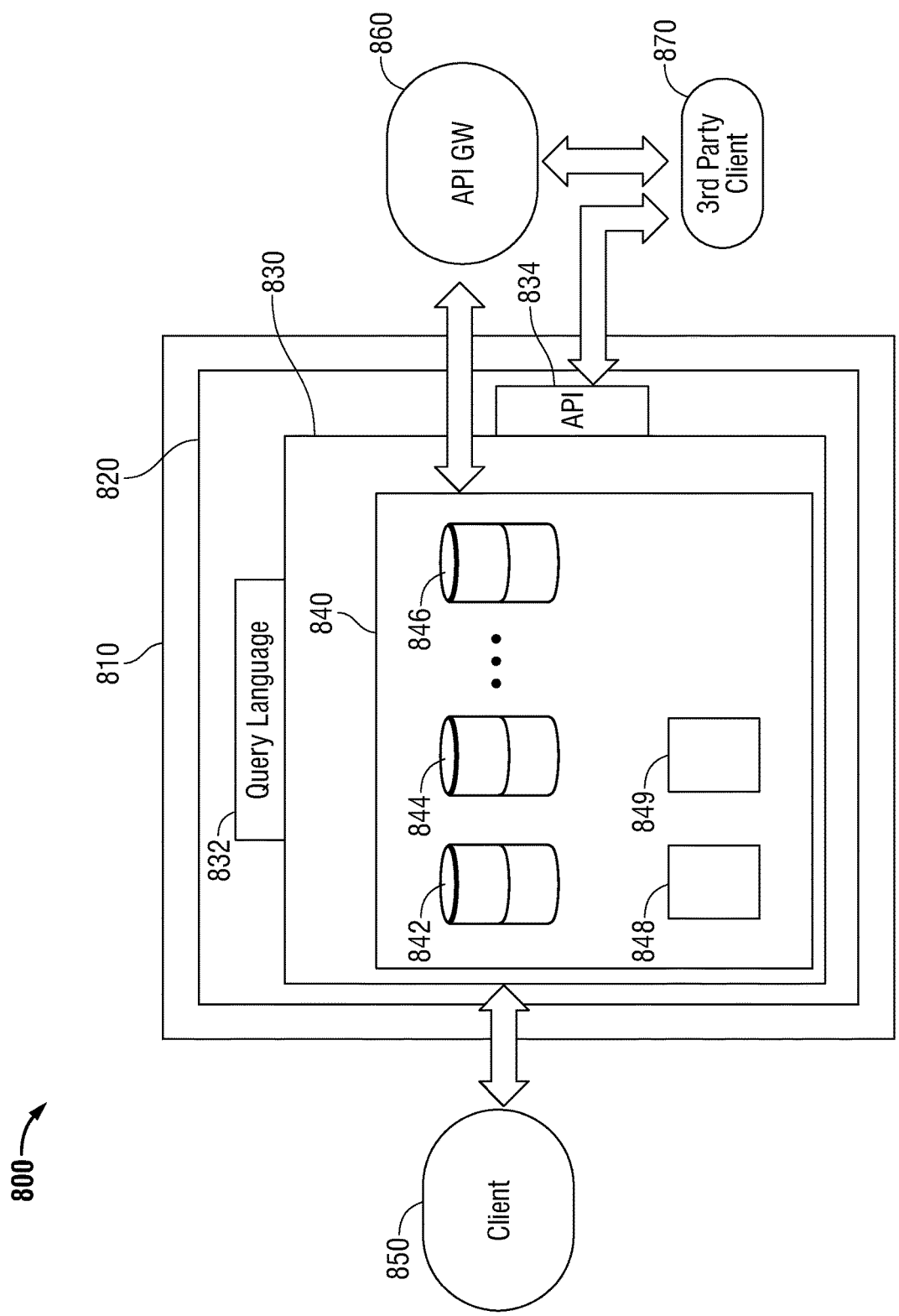
FIG. 8 illustrates an exemplary system environment.

FIG. 8 illustrates an embodiment of an environment 800 to support and implement the methods and systems described herein. Environment 800 includes computing system 810, which hosts the software and hardware resources required to implement the methods described herein and includes one or more computers. Each computer includes or is operationally coupled to memory to store data and the computer software and instructions that implement the methods described herein, at least one processing unit to execute the computer software and instructions, persistent or non-transitory storage to store data, and network/communication subsystems to network and communicate with other computer systems. One or more computers may be virtual. The computers are preferably connected via one or more networks, and software tasks and data storage may be distributed over one or more computers. Computing system 810 may be deployed in whole or in part on on-premises computer(s) or hardware appliance(s), or in the cloud. Computing system 810 may include one or more web servers, application servers, or data servers.

Computing system 810 includes software system 820. Software system 820 includes the software and instructions to implement the methods described herein. Software system 820 may also include other software and instructions, including application software and system software. Software system 820 may include user interface software, including one or more APIs 834, to communicate with, ingest, receive or respond to requests for data from, and provide access to the system to, authorized clients 850 and third-parties 870. Software system 820 may also support an API gateway 860. In an embodiment software system 820 provides firewall and other security functions to perform authentication and prevent unauthorized access to the system. Software system 820 in an embodiment may include query language software and interface 832 for accessing and querying the one or more data stores in core 840.

Software system 820 may include core 830, which provides the software to support core system applications and persistent data storage management. Core 830 may include one or more persistent data stores 842, 844, and 846. Persistent data stores 842, 844, 846 may be used for storing system data, application data, performance metrics, sensor data, digital documents, log data, transaction logs, commit logs, index logs, client transaction data, value store, transaction metadata, one or more Merkle tree or incremental hash trees, append-only hash trees, b-tree like data structures, binary trees, key-value indices, search tree index, value data stores, or any other collection of data. One or more persistent data stores may include one or more relational databases, no-SQL databases, directories, key-value stores, append-only data files, append-only transaction data files, binary tree data structures, b-tree data structures, b-tree-like data structures, binary trees, key-value indices, search tree indices, value data stores, value logs, or any other data file or data structure operative to store data for use by a computer application or system. Persistent data stores 842, 844, 846 may include data or metadata for one or more clients. Client transaction data (for example, a transaction data file, key-value data store, or a value data store) or metadata (for example, an incremental hash tree) or search index data (including for example, a search index tree or b-tree like data structure) may be subdivided or stored in one or more parts or partitions stored in persistent data stores 842, 844, and 846. Core 830 may include, in an embodiment, other application software or software modules 840. Core 830 may include an indexing data structure, for example a search tree index, which preferably is stored in persistent data stores 842, 844, 846, and indexing software 849 to administer the indexing data structure. In an embodiment, key data and metadata from key-value pairs may be stored in a search tree index in a persistent data store and the corresponding value data may be stored in a separate value data store in a persistent data store. In an embodiment, copies of the search tree index may also be stored in RAM or other media conducive to faster searches.

Figure 9:
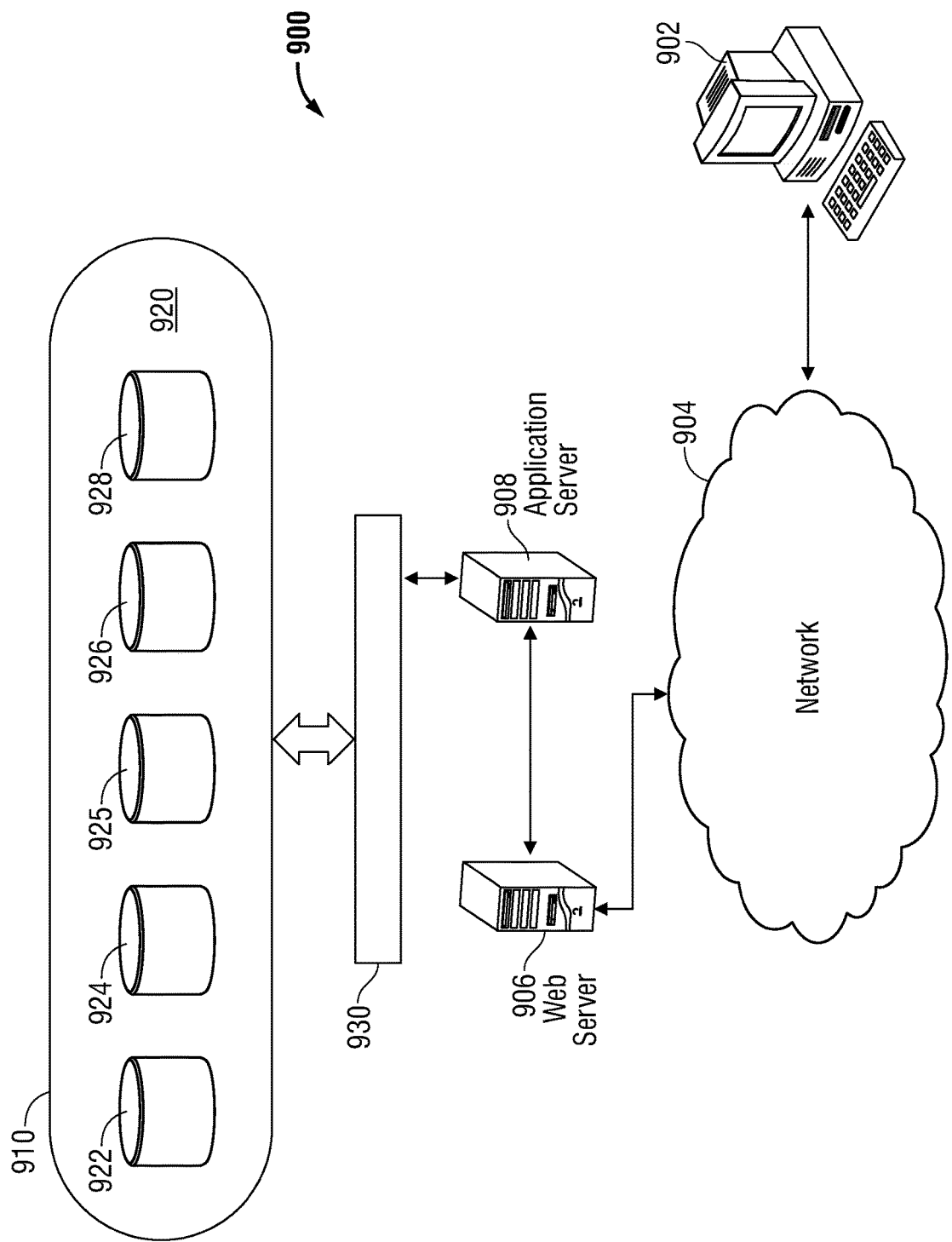
FIG. 9 illustrates an exemplary hardware environment.

FIG. 9 illustrates aspects of an exemplary embodiment of a hardware environment 900 for implementing the methods and systems described here. The exemplary environment 910 may include an electronic client device 902, which can include any appropriate device operable to send and/or receive requests, messages, or information over an appropriate network 904 and, in some embodiments, convey information back to a user of the device. Examples of such client devices include personal computers, workstations, servers, cell phones, smart phones, handheld messaging devices, laptop computers, tablet computers, set-top boxes, personal data assistants, embedded computer systems, electronic book readers, and the like. The network 904 can include any appropriate network, including an intranet, the Internet, a cellular network, a local area network, a satellite network, or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In an embodiment, the network may include the Internet, the World-wide Web, and/or other publicly-addressable communications network, and the environment may include a web server 906 for receiving requests and serving content in response thereto, although for other networks an alternative device serving a similar purpose, or web server software implemented on an application server, could be used as would be apparent to one of ordinary skill in the art.

The illustrative environment includes computing system 900 and software system 920, for example, in an embodiment, computing system 810 and software system 820 shown in FIG. 8 and described above. In an embodiment, computing system 900 may include at least one application server 908 (which may include or be operationally coupled to one or more data stores), and in an embodiment application server 906 and web server 908 may be combined. It may also include one or more data servers hosting one or more data stores (not shown). It should be understood that there can be several application servers, layers, or other elements, processes, or components, which may be chained or otherwise configured, which can interact to perform tasks such as hosting or obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and computer-readable data storage media, in any standard, distributed, virtual, or clustered environment. The term "non-transitory data store" refers to a data store comprising non-transitory storage media. The application server can include any appropriate hardware, software, and firmware for integrating with the data store as needed to execute aspects of one or more applications for the client device, handling some or all of the data access and business logic for an application.

In an embodiment the application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. In an embodiment, content transferred to a client device 902 may be processed by the client device to provide the content in one or more forms including, but not limited to, forms that are perceptible to the user audibly, visually, and/or through other senses. The handling of all requests and responses, as well as the delivery of content between the client device 902 and the application server 908, can be handled by optional web server 906 using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

Software system 920 can include or more separate data tables, databases, data documents, dynamic data storage schemes, and/or other data storage mechanisms and media for storing data relating to particular aspects of the present disclosure. For example, software system 920 may store or host one or more value logs 922, transaction logs 924, appendable hash tree 925, commit log 926, and index 928. The data store illustrated may include mechanisms for storing production data, client data, and user data, which can be used to serve content for the production side. The data store also is shown to include a mechanism for storing system data or log data, which can be used for reporting, analysis, or other such purposes. Software system 920 may also include database management software for an immutable database and other software including application code software, modules, and/or logic 930 operable, through logic associated therewith, to receive instructions from the application server 908, and obtain, update, or otherwise process data in response thereto.

Each server typically will include an operating system that provides executable program instructions for the general administration and operation of that server and typically will include a computer-readable storage medium (e.g., a hard disk, random access memory, read only memory, etc. storing instructions that, when executed (i.e., as a result of being executed) by a processor of the server, allow the server to perform its intended functions. The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the hardware environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as containers, virtual machines, hypervisors, and other virtual devices capable of communicating via a network.

Various embodiments of the present disclosure utilize at least one network 904 that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UPnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server 906, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java (registered trademark), Go, C, C#, or C++, or any scripting language, such as Ruby, PHP, Perl, Python, or TCL, or Net, and NodeJS, as well as combinations thereof. The server(s) may also include database servers, including without limitation those commercially available from Oracle (registered trademark), Microsoft (registered trademark), Sybase (registered trademark), and IBM (registered trademark), as well as open-source servers such as MySQL, Postgres, SQLite, MongoDB, Redis, and any other server capable of storing, retrieving, and accessing structured or unstructured data. Database servers may support different types of databases, including table-based, document-based, unstructured, relational, non-relational, or combinations of these and/or other database types.

The environment can include a variety of data stores and other memory and storage media as discussed above. In an embodiment, computing system 900 may reside on a single machine. In alternative embodiments, computing system 900 may reside in a variety of locations, such as on a storage medium local to (and/or resident in) one or more of the computers or remote from any or all of the computers across the network. The information may reside in a storage-area network ("SAN"). Similarly, any necessary files for performing the functions attributed to the computers, servers, or other network devices may be stored locally and/or remotely, as appropriate. Where a system may include computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory, as described above. The computer-readable storage media reader can be connected with, or configured to receive, a computer-readable storage medium, representing remote, local, fixed, and/or removable storage devices as well as storage media for persistently, or temporarily and/or more permanently, containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory, or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors.

The computer-readable storage media described herein may be non-transitory. The term "non-transitory," as used herein, defines a characteristic of the medium itself (i.e., tangible, not a signal) as opposed to a characteristic of data storage persistency (e.g., RAM vs. ROM). In some embodiments, the code (or software) is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media, and one or more of individual non-transitory storage media of the multiple non-transitory computer-readable storage media may lack all of the code while the multiple non-transitory computer-readable storage media collectively store all of the code.

Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

Those of skill will recognize that the methods, processes, and techniques of the embodiments described herein may be implemented to advantage in a variety of sequential orders and that embodiments may be generally implemented in a non-transitory physical medium, preferably magnetic or optical media such as RAM, RAM drives, USB drives, SD memory, disks, tapes, DVDs and CD-ROMs or other persistent storage media, for introduction into and/or use by a computer system described herein. In such cases, the physical medium will contain computer software or program instructions embedded in the media that, when executed by one or more processors, will execute the steps and perform the methods, processes, and techniques described herein of embodiments of an immutable database. Data and instructions for the operating systems, virtual machines, and applications or programs may reside on persistent storage devices and may be loaded into memory media for execution by one or more processors. Applications may contain instructions that are loaded into memory media containing a Virtual Machine and executed by a Virtual Machine. The processes of the illustrative embodiments may be performed by processors using computer implemented instructions, which may be located in memory media.

There are numerous embodiments and examples that may be given. A number of examples follow.

Example 1: An immutable database system that supports physical deletion of data.

Example 2: An immutable database system, adapted and configured to store key-value transaction data and further adapted and configured to physically delete specified value data.

Example 3: An immutable database system, adapted and configured to physically delete specified data.

Example 4: An immutable database system, adapted and configured to physically delete specified data pursuant to a data retention policy.

Example 5: An immutable database system, adapted and configured to physically delete specified data while preserving database immutability.

Example 6: An immutable database system, adapted and configured to physically delete specified data pursuant to a data retention policy while preserving database immutability.

Example 7: An immutable database system, adapted and configured to store cryptographic proof data, and further adapted and configured to physically delete specified data.

Example 8: An immutable database system, adapted and configured to store cryptographic proof data, further adapted and configured to physically delete specified data pursuant to a data retention policy.

Example 9: An immutable database system, adapted and configured to store cryptographic proof data and further adapted and configured to physically delete specified data while preserving database immutability.

Example 10: An immutable database system, adapted and configured to store cryptographic proof data and further adapted and configured to physically delete specified data while preserving the integrity of the cryptographic proof data.

Example 11: An immutable database system, adapted and configured to store cryptographic proof data and further adapted and configured to physically delete specified data while preserving database immutability and preserving the integrity of the cryptographic proof data.

Example 12: An immutable database system, adapted and configured to store cryptographic proof data and further adapted and configured to physically delete specified data pursuant to a data retention policy while preserving database immutability and preserving the integrity of the cryptographic proof data.

Example 13: The immutable database systems of examples 3-12, where the immutable database system is further adapted and configured to store key-value transaction data.

Example 14: The immutable database systems of example 13, where the immutable database system is further adapted and configured to delete value data for specified transactions.

Example 15: The immutable database systems of examples 13-14, where the immutable database system is further adapted and configured to store key-value transaction data in append-only data files.

Example 16: The immutable database systems of examples 10-14, where preserving the integrity of the cryptographic proof data comprises preserving data sufficient to prove consistency and inclusion for data stored in the immutable database after specified data has been deleted.

Example 17: In an immutable database system comprising one or more data logs comprising asynchronously-stored data, deleting specified transaction data from the one or more logs while preserving immutability.

Example 18: In an immutable database system comprising one or more data logs comprising asynchronously-stored data and cryptographic proof data, deleting specified transaction data from the one or more logs while preserving the integrity of the cryptographic proof data.

Example 19: In an immutable database system comprising one or more data logs comprising asynchronously-stored data, truncating one or more data logs while preserving immutability.

Example 20: In an immutable database system comprising one or more data logs comprising asynchronously-stored data and cryptographic proof data, truncating one or more logs while preserving the integrity of the cryptographic proof data.

Example 21: The immutable database systems of examples 17-20, where the one or more data logs are append-only.

Example 22: The immutable database systems of examples 3-20, further configured to preserve database schema data while physically deleting specified data or truncating one or more data logs.

Example 23: The immutable database systems of example 22 where the database schema data comprises a SQL schema data.

Although embodiments of the present invention have been described in detail, it will be apparent to those skilled in the art that many embodiments taking a variety of specific forms and reflecting changes, substitutions and alterations can be made without departing from the spirit and scope of the inventions disclosed herein. The described embodiments illustrate the scope of the claims but do not restrict the scope of the claims.

What is claimed is:

1. A cryptographically-verifiable immutable database system, comprising:

An immutable database computer system adapted and configured to store transaction data for a plurality of transactions as key-value pairs and to generate cryptographic verification data for such transaction data, comprising:

an append-only value log comprising a plurality of data files comprising transaction value data for the plurality of transactions stored as key-value pairs, including a first data file comprising first transaction value data from a first transaction;

an append-only hash tree comprising cryptographic verification data for the transaction data stored in the immutable database system, including first transaction verification data corresponding to the first transaction;

executable instructions that, when executed by a processor, cause the immutable database computer system to:

determine that the first transaction satisfies deletion criteria; and permanently delete the first transaction value data, preserving the first transaction verification data in the append-only hash tree.

2. The cryptographically-verifiable immutable database system of claim 1, wherein the executable instructions to permanently delete the first transaction value data further comprise executable instructions to permanently delete the first data file.

3. The cryptographically-verifiable immutable database system of claim 2, wherein the transaction value data is stored asynchronously by concurrent processes, wherein the first data file comprises transaction value data for other transactions in addition to the first transaction, and all transaction value data stored in the first data file corresponds to transactions that satisfy the deletion criteria.

4. The cryptographically-verifiable immutable database system of claim 1, wherein the executable instructions to permanently delete the first transaction value data further comprise executable instructions to truncate the append-only value log.

5. The cryptographically-verifiable immutable database system of claim 1, wherein the immutable database system comprises first and second append-only value logs comprising asynchronously-stored transaction data, the first append-only value log comprising first transaction value data corresponding to the first transaction.

6. The cryptographically-verifiable immutable database system of claim 5, wherein the executable instructions to permanently delete the first transaction value data further comprise executable instructions to truncate the first append-only value log without truncating the second append-only value log.

7. The cryptographically-verifiable immutable database system of claim 1, wherein the executable instructions to permanently delete the first transaction value data further comprise executable instructions to preserve database schema data for the immutable database system.

8. The cryptographically-verifiable immutable database system of claim 1, wherein cryptographic verification data comprises data sufficient to perform an inclusion proof or consistency proof for the transaction.

9. The cryptographically-verifiable immutable database system of claim 1, wherein transaction value data comprises the value components of the key-value pairs.

10. A computer-implemented method of permanently deleting data from a cryptographically-verifiable immutable database computer system, comprising:
    under control of an immutable database computer system adapted and configured to store transaction data for a plurality of transactions and to generate cryptographic verification data for such transactions, wherein under control of the immutable database computer system comprises execution of executable instructions by a processor, the immutable database computer system comprising an append-only value log comprising a plurality of data files comprising transaction value data for the plurality of transactions, including a first data file comprising first transaction value data from a first transaction, wherein the transaction value data is stored asynchronously by concurrent processes, and an append-only hash tree comprising cryptographic verification data for the transaction data stored in the immutable database computer system, including first transaction verification data corresponding to the first transaction,
    determining that the first transaction satisfies deletion criteria; and
    permanently deleting the first transaction value data, preserving the first transaction verification data in the append-only hash tree.

11. The computer-implemented method of permanently deleting data from a cryptographically-verifiable immutable database system of claim 10, further comprising, under control of the immutable database computer system, permanently deleting the first data file.

12. The computer-implemented method of permanently deleting data from a cryptographically-verifiable immutable database system of claim 11, wherein the first data file comprises transaction value data for other transactions in addition to the first transaction, and all transaction value data stored in the first data file corresponds to transactions that satisfy the deletion criteria.

13. The computer-implemented method of permanently deleting data from a cryptographically-verifiable immutable database system of claim 10, wherein the plurality of data files are linearly ordered, further comprising, under control of the immutable database computer system:
    identifying a second data file within the plurality of data files such that there are one or more lower-valued data files that are lower than the second data file within the linear ordering of the plurality of data files, wherein all transaction value data stored in each of the one more lower-valued data files corresponds to transactions that satisfy the deletion criteria; and
    permanently deleting the one or more lower-valued data files.

14. The computer-implemented method of permanently deleting data from a cryptographically-verifiable immutable database system of claim 13, wherein identifying the second data file further comprises searching a transaction log for transactions that are stored in a data file lower than the second data file within the linear ordering of the plurality of data files and that do not satisfy the deletion criteria.

15. The computer-implemented method of permanently deleting data from a cryptographically-verifiable immutable database system of claim 10, further comprising, under control of the immutable database computer system, preserving database schema data for the immutable database system.

16. The computer-implemented method of permanently deleting data from a cryptographically-verifiable immutable database system of claim 10, further comprising, under control of the immutable database computer system:
    following permanent deletion of the first transaction value data, providing, in response to a request, first transaction verification data.

17. The computer-implemented method of permanently deleting data from a cryptographically-verifiable immutable database system of claim 10, wherein first transaction verification data comprises data sufficient to perform an inclusion proof or consistency proof for the first transaction.

18. A cryptographically-verifiable immutable database system, comprising:
    An immutable database computer system adapted and configured to store transaction data for a plurality of transactions and to generate cryptographic verification data for such transaction data, wherein the immutable database computer system comprises first transaction value data and first transaction verification data corresponding to a first transaction,
    wherein the immutable database computer system further comprises executable instructions that, when executed by a processor, cause the immutable database system to:
        determine that the first transaction satisfies deletion criteria; and
        permanently delete the first transaction value data, preserving the first transaction verification data.

19. The cryptographically-verifiable immutable database system of claim 18, wherein the executable instructions to permanently delete the first transaction value data further comprise executable instructions to preserve database schema data for the immutable database system.

20. The cryptographically-verifiable immutable database system of claim 18, wherein the transaction data is stored asynchronously by concurrent processes, wherein the executable instructions to permanently delete the first transaction value data further comprise executable instructions to permanently a first data file, wherein all transaction value data stored in the first data file corresponds to transactions that satisfy the deletion criteria.

* * * * *